United States Patent [19]
Euzen et al.

[11] Patent Number: 5,899,679
[45] Date of Patent: * May 4, 1999

[54] CATALYTIC COMBUSTION PROCESS USING A PLURALITY OF SUCCESSIVE CATALYTIC ZONES

[75] Inventors: Patrick Euzen, Rueil Malmaison; Jean-Herve Le Gal, Paris; Gerard Martin, Rueil Malmaison, all of France

[73] Assignee: Institut Francais du Petrole, France

[ * ] Notice: This patent is subject to a terminal disclaimer.

[21] Appl. No.: 08/769,826

[22] Filed: Dec. 20, 1996

[30] Foreign Application Priority Data

Dec. 28, 1995 [FR] France .................................. 95 15625

[51] Int. Cl.$^6$ .............................. F23M 13/00; B01J 19/00
[52] U.S. Cl. ........................... 431/7; 423/210; 423/245.3; 502/302; 502/304; 502/324; 502/325; 502/326; 502/340; 502/341
[58] Field of Search .................................. 431/2, 170, 7; 423/245.3, 210; 502/302, 304, 324, 325, 326, 340, 341; 122/4 D

[56] References Cited

U.S. PATENT DOCUMENTS

| | | | |
|---|---|---|---|
| 4,220,559 | 9/1980 | Polinski ............................... | 252/455 R |
| 4,378,307 | 3/1983 | Brunelle et al. ..................... | 252/455 R |
| 4,731,989 | 3/1988 | Furuya et al. ......................... | 60/39.05 |
| 4,788,174 | 11/1988 | Arai ....................................... | 502/324 |
| 4,793,797 | 12/1988 | Kato et al. .................................. | 431/7 |
| 4,857,499 | 8/1989 | Ito et al. ................................. | 502/326 |
| 4,959,339 | 9/1990 | Arai ....................................... | 502/302 |
| 5,281,128 | 1/1994 | Dalla Betta et al. ........................ | 431/7 |
| 5,643,543 | 7/1997 | Guibard et al. ....................... | 423/213.5 |

FOREIGN PATENT DOCUMENTS

| | | |
|---|---|---|
| 0 044 117 A3 | 1/1982 | European Pat. Off. . |
| 0 089 199 A2 | 9/1983 | European Pat. Off. . |
| 0 125 565 A2 | 11/1984 | European Pat. Off. . |
| 0 198 948 A2 | 10/1986 | European Pat. Off. . |
| 0 270 203 A1 | 6/1988 | European Pat. Off. . |
| 0 326 845 A3 | 8/1989 | European Pat. Off. . |
| 2 721 837 A1 | 1/1996 | France . |
| 2 726 774 A1 | 5/1996 | France . |
| 61-252409 | 11/1986 | Japan . |
| 4-193344 | 7/1992 | Japan . |
| 4-197443 | 7/1992 | Japan . |
| WO-92/09848 | 6/1992 | WIPO . |
| WO-92/09849 | 6/1992 | WIPO . |

OTHER PUBLICATIONS

Reay "Catalytic Combustion: Current Status and Implications for Energy Deficiency in the Process Industries" *Heat Recovery Systems & CHP* vol. 13 No. 5 pp. 383–390, 1993 No Month.

Jones Et al. "Combustion Catalytique et Gaz Natural" Revue Generale De Thermique vol. 28 No. 's 330–331 pp. 401–406; Paris France, Jun./Jul. 1989.

*Primary Examiner*—Gary P. Straub
*Assistant Examiner*—Timothy C. Vandy
*Attorney, Agent, or Firm*—Millen, White, Zelano & Branigan, P.C.

[57] ABSTRACT

A catalytic combustion process for at least one fuel comprises the use of a plurality of successive catalytic zones, the process being characterized in that at least one of the first catalytic zones includes a catalyst comprising a monolithic substrate, a porous support based on a refractory inorganic oxide and an active phase constituted by cerium, iron and optionally zirconium, also at least one metal selected from the group formed by palladium and platinum; and in that at least one of the subsequent catalytic zones includes an active phase comprising: an oxide of at least one element A with valency X selected from the group formed by barium, strontium and rare-earths; at least one element B with valency Y selected from the group formed by Mn, Co and Fe; and at least one element C selected from the group formed by Mg and Zn, and aluminium; the oxide may have formula $A_{1-x}B_yC_zAl_{12-y-z}O_{19-\delta}$, x being 0 to 0.25, y being 0.5 to 3; and z being 0.01 to 3; the sum y+z having a maximum value of 4 and $\delta$ having a value which is a function of the respective valencies X and Y of elements A and B and the values of x, y and z, and is equal to $1-\frac{1}{2}\{(1-x)X+yY-3y-z\}$.

20 Claims, No Drawings

CATALYTIC COMBUSTION PROCESS USING A PLURALITY OF SUCCESSIVE CATALYTIC ZONES

The present invention concerns a catalytic combustion process comprising the use of a plurality of successive catalytic zones.

BACKGROUND OF THE INVENTION

Conventional combustion, carried out in the presence of a flame and normally used in hydrocarbon combustion processes such as that of natural gas, is a process which is difficult to control. It takes place in a range of set air/hydrocarbon concentrations and, apart from carbon dioxide and water formation, it produces pollutants such as carbon monoxide and oxides of nitrogen.

The accelerating severity of environmental restrictions on pollutants (oxides of nitrogen, unburned hydrocarbons, carbon monoxide) emitted by combustion processes has meant that new technologies have had to be found which can considerably reduce such emissions. A number of solutions are well known to the skilled person:

Selective reduction of exhaust gases (SCR, Selective Catalytic Reduction). Selective reduction of oxides of nitrogen by ammonia can reduce $NO_x$ concentrations to about 10 ppm. However, this solution requires a runaway use of a special reactor, and the storage and use of ammonia; thus installation costs and operating costs of SCR are high.

Injection of water or steam. Such injection reduces the temperature reached by the combustion gases thus significantly reducing $NO_x$ concentrations to about 50 ppm. The additional cost of such an apparatus is low. However, the operating costs of such an installation are high as the water must be purified prior to injection and because of an overconsumption of fuel due to a reduction in the energy yield. Further, while water injection satisfies current limits, it will not satisfy future limits for $NO_x$.

A primary lean mixture zone. This technology is based on improving the homogeneity of the air/fuel mixture. It can reduce $NO_x$ emissions to about 50 ppm, but such a reduction is to the detriment of carbon monoxide and unburned hydrocarbon emissions, which increase.

Catalytic combustion is a seductive solution by which to respond to the increasing severity of pollutant limits. The catalytic combustion chamber advantageously replaces conventional burners as it allows better control of complete oxidation over a wide range of air/hydrocarbon ratios, thus greatly reducing emissions of oxides of nitrogen, unburned hydrocarbons and carbon monoxide. Further, it can be used to burn a wide variety of compounds.

Thus, as described in particular in the article by D. Reay in "Catalytic Combustion: Current Status and Implications for Energy Efficiency in the Process Industries", Heat Recovery Systems and CHP, 13, No 5, pp 383–390, 1993 and by D. Jones and S. Salfati in Rev. Gén. Therm. Fr. No. 330–331, pp 401–406, June–July 1989, catalytic combustion has a variety of applications: radiant panels and tubes, catalytic afterburners, gas turbines, cogeneration, burners, catalytic sleeves for steam reforming tubes, production of hot gases in the heating field by direct contact and catalytic plate reactors.

In catalytic combustion processes in the fields of energy production and cogeneration, the most widely used reactor configuration is a reactor comprising a plurality of catalytic zones: the catalyst(s) at the inlet are more specifically dedicated to initiating the combustion reaction, while the subsequent catalysts stabilise the combustion reaction at high temperature; the number of catalytic stages (or zones) is adjusted as a function of the conditions imposed by the envisaged application.

Combustion catalysts are generally prepared from a monolithic substrate of ceramic or metal on which a fine support layer is deposited which is constituted by one or more refractory oxides with greater surface area and porosity to that of the monolithic substrate. The active phase, which is essentially composed of metals from the platinum group, is dispersed on the oxide.

As is known to the skilled person, platinum group metals have the highest catalytic activity for hydrocarbon oxidation and thus initiate combustion at a lower temperature than transition metal oxides. Preferably, then, they are used in the first catalytic zones. However, because of the high temperatures reached either during start-up phases or in a steady state, such catalysts degrade, causing a drop in their catalytic performances. Sintering the alumina based support and sintering the active metal phase and/or encapsulating it by the support are the causes which are most frequently cited to explain such degradation.

The drop in the specific surface area of alumina based supports is known to be stabilised effectively by a suitable doping agent. Rare earths and silica are often cited as being among the most effective stabilisers for alumina. Catalysts prepared using this technique have been described in U.S. Pat. No. 4,220,559, among others. In that document, the catalyst includes platinum group metals or transition metals deposited on alumina, an oxide of a metal selected from the group constituted by barium, lanthanum and strontium and an oxide of a metal selected from the group constituted by tin, silicon, zirconium and molybdenum.

In addition, to limit sintering of the active metallic phase, the addition of a variety of stabilisers essentially based on transition metal oxides has been proposed.

Thus U.S. Pat. No. 4,857,499 describes a catalyst comprising a porous support with a pore diameter which is in the range 150 Å to 300 Å and with a proportion by weight with respect to the substrate which is preferably in the range 50 to 200 g/l, an active phase including at least 10% by weight, with respect to the porous support, of a precious metal selected from the group formed by palladium and platinum; a first promoter including at least one element selected from the group constituted by lanthanum, cerium, praseodymium, neodymium, barium, strontium, calcium and oxides thereof, in which the proportion by weight with respect to the porous support is in the range 5% to 20%; a second promoter including at least one element selected from the group formed by magnesium, silicon and oxides thereof, in which the proportion by weight with respect to the active phase is no more than 10%; and a third promoter including at least one element selected from the group constituted by nickel, zirconium, cobalt, iron and manganese, and oxides thereof, in which the proportion by weight with respect to the active phase is no more than 10%. Further, that catalyst can be deposited on a monolithic substrate which is in the group formed by cordierite, mullite, alpha alumina, zirconia, and titanium oxide; the proportion by weight of porous support with respect to the substrate volume is in the range 50 g/l to 200 g/l.

U.S. Pat. No. 4,793,797 describes a catalyst comprising an inorganic support selected from the group constituted by oxides, carbides and nitrides of elements from groups IIa, IIIa and IV of the periodic classification of the elements, or selected from the group constituted by La—β—$Al_2O_3$, Nd—β—$Al_2O_3$, Ce—β—$Al_2O_3$ or Pr—β—$Al_2O_3$, at least one precious metal selected from the group constituted by palladium, platinum, rhodium and ruthenium, and at least one oxide of a base metal selected from the group constituted by magnesium, manganese, cobalt, nickel, strontium, niobium, zinc, tin, chromium and zirconium, such that the atomic ratio of base metal to precious metal is in the range 0.1 to 10.

In addition, regarding formulations which can act at high temperature, mixed oxides are generally more resistant than precious metals. Of such oxides, perovskites and more particularly $LaMnO_3$, $LaCoO_3$ and $La_{1-x}Sr_xMnO_3$ where $0 \leq x \leq 0.2$ are important for the catalytic oxidation of hydrocarbons, but their surface area drops rapidly when the temperature goes beyond 800° C. H. Arai et al. have proposed formulations based on hexaaluminates containing manganese which are a good activity/thermal stability compromise, as described in U.S. Pat. No. 4,788,174, in particular. The catalytic combustion catalyst proposed can be represented by the formula: $Al_{1-z}C_zB_xAl_{12-y}O_{19-\alpha}$, where A is at least one element selected from the group constituted by Ba, Ca and Sr, with ($0.0 \leq z \leq 0.4$);

B is at least one element selected from the group constituted by Mn, Fe, Co, Ni, Cu and Cr, with ($x \leq y \leq 2x$);

C is K and/or Rb; and $\alpha = 1 - \frac{1}{2}\{X-z(X-Y)+xZ-3Y\}$ where X, Y, Z are the respective valencies of elements A, C and B.

H. Arai et al. have also proposed the addition of a precious metal to such catalysts, as described in particular in U.S. Pat. No. 4,959,339. The catalyst proposed is represented by the formula: $A_{1-z}C_zB_xD_uAl_{12-y-u}O_{19-\alpha}$, (where A is at least one element selected from the group constituted by Ba, Ca and Sr, with ($0.0 \leq z \leq 0.4$);

B is at least one element selected from the group constituted by Mn, Fe, Co, Ni, Cu and Cr, with ($x \leq y \leq 2x$);

C is at least one element selected from the group constituted by K, Rb and the rare earths;

D is at least one element selected from the group constituted by Au, Ag, Pd, Pt and other precious metals of the platinum group, where $x+u \leq 4$; and $\alpha = 1 - \frac{1}{2}\{X-z(X-Y)+xZ+uU-3y-3u\}$ where X, Y, Z and U are the respective valencies of elements A, C and B and D.

Some particularly representative patents concerning combustion reactors with a plurality of catalytic zones are:

European patent application EP-A-0 198 948 which uses: in the $1^{st}$ catalytic zone: Pd and Pt and NiO, and in the $2^{nd}$ catalytic zone: Pt and Pd;

Japanese patent application JP-A-04/197 443 which uses: in the $1^{st}$ catalytic zone: Pd and/or Pt; in the $2^{nd}$ catalytic zone: $Sr_{0.8}La_{0.2}MnAl_{11}O_{19-\alpha}$; and in the $3^{rd}$ catalytic zone: $Sr_{0.8}La_{0.2}MnAl_{11}O_{19-\alpha}$;

International patent applications WO-A-92/9848 and WO-A-92/9849 which use:
in the $1^{st}$ catalytic zone: Pd and (Pt or Ag);
in the $2^{nd}$ catalytic zone: Pd and (Pt or Ag); and
in the $3^{rd}$ catalytic zone: perovskite $ABO_3$ or an oxide of a metal from group V(Nb or V), group VI (Cr) or group VW (Fe, Co, Ni).

The critical point of a multi-stage process is control of the temperature in the different catalytic stages. If a run-away combustion reaction occurs, the temperature of the catalyst can rapidly reach the adiabatic temperature. It is important to cover the whole of the charge range of a gas turbine. The air-fuel ratio can vary widely from ignition to full charge via the throttle. Using such a catalytic combustion chamber can thus be difficult.

A global approach to the catalytic combustion process, taking into account both the advantages and disadvantages of the catalytic reactor configuration and the catalytic formulation, thus appears to be vital. Further, despite the large amount of development work which has already been carried out, it is still important to find a catalytic reactor configuration—catalytic formulation combination which will satisfy the ever more draconian demands on a combustion process.

The assignee's French patent application FR-A-2 726 774 describes combustion catalysts comprising iron and cerium associated with palladium and/or platinum deposited on a refractory inorganic oxide.

The assignee's French patent FR-B-2 721 837 describes combustion catalysts which essentially have the formula $A_{1-x}B_yC_zAl_{12-y-z}O_{19-\alpha}$, where A represents at least one element with valency X selected from the group formed by barium, strontium and rare earths; B represents at least one element with valency Y selected from the group formed by Mn, Co and Fe; C represents at least one element selected from the group formed by Mg and Zn; x is 0 to 0.25, y is 0.5 to 3 and z is 0.01 to 3; the sum y+z has a maximum value of 4 and δ has a value which, determined as a function of the respective valencies X and Y of elements A and B and the values of x, y and z, is equal to $1-\frac{1}{2}\{(1-x)X+yY-3y-z\}$.

SUMMARY OF THE INVENTION

Our research has led us to the discovery that, surprisingly, it is of particular advantage to combine the two types of catalysts described above in successive catalytic zones.

The present invention thus provides a catalytic combustion process comprising the use of a plurality of successive catalytic zones, said process being characterized in that at least one of the first catalytic zones includes a catalyst comprising a monolithic substrate, a porous support based on a refractory inorganic oxide and an active phase constituted by cerium, iron and optionally zirconium, also at least one metal selected from the group formed by palladium and platinum; and in that at least one of the subsequent catalytic zones includes an active phase comprising at least one oxide of at least one element A with valency X selected from the group formed by barium, strontium and rare-earths; at least one element B with valency Y selected from the group formed by Mn, Co and Fe; and at least one element C selected from the group formed by Mg and Zn; the oxide can have formula $A_{1-x}B_yC_zAl_{12-y-z}O_{19-\alpha}$, x being 0 to 0.25, y being 0.5 to 3; and z being 0.01 to 3; the sum y+z having a maximum value of 4 and δ having a value which is a function of the respective valencies X and Y of elements A and B and the values of x, y and z, and is equal to $1-\frac{1}{2}\{(1-x)X+yY-3y-z\}$.

For simplification, the process of the invention will be described below as using a first catalytic zone and a second catalytic zone, but it should be understood that said first zone may comprise a plurality of successive elementary zones and said second zone may also comprise a plurality of successive elementary zones.

Generally, in a catalyst for the first zone in the process of the present invention, the amount of porous support is in the range 100 g to 400 g, more particularly in the range 200 g to 400 g per liter of catalyst; the cerium content is in the range 0.3% to 20% by weight with respect to the porous support; the iron content is in the range 0.01% to 3.5% by weight with respect to the support; the zirconium content is in the range 0 to 20%, more particularly in the range 0.3% to 20% by weight with respect to the porous support, and the palladium and/or platinum content is over 3 g per liter of catalyst.

Preferably, for a catalyst for the first zone in the process of the present invention, the porous support is in the range 200 g to 350 g per liter of catalyst; the cerium content is in the range 2% to 15% by weight with respect to the porous support; the iron content is in the range 0.1% to 2% by weight with respect to the support; the zirconium content is in the range 2% to 15% by weight with respect to the porous support, and the palladium and/or platinum content is in the range 5 a to 15 g per liter of catalyst.

As indicated above, the amount of porous support of catalyst in the first zone of the process of the present invention is preferably in the range 100 g to 400 g per litre of catalyst, preferably in the range 200 g to 400 g, and more preferably in the range 200 g/l to 350 g/l. If the amount of porous support is below 100 g/l, the catalytic activity is not sufficient. Conversely, more than 400 g/l of porous support is also deleterious to the catalytic activity as it results in a blockage of the channels in the monolith.

In catalysts for the first zone of the process of the invention, the monolithic substrate can consist of a monolith with a cellular structure, of ceramic or metal (roll, stack of metal sheets or a combination of metal fibres or wires in the form of a monolith with a fibrous structure). The ceramic can be mullite, cordierite, α-alumina, zirconia, aluminium titanate, silicon carbide, silicon nitride or mixtures thereof. These monolithic substrates are produced by extrusion. Metal alloys preferably have refractory properties. They can, for example, be composed of iron, chromium, aluminium and cerium or yttrium such as Gilphal 135® steel from IMPHY. The metal substrate may have been pre-oxidised at a temperature which is in the range 700° C. to 1200° C., preferably in the range 800° C. to 1000° C. The cell density, i.e., the number of cells per cross section of monolith, is generally in the range 50 to 60 cells per square inch (7.75 to 93 cells per cm$^2$).

Preparation and forming of the support can constitute the first step in preparing the catalyst for the first zone. The support, based on a refractory oxide, is generally selected from the group formed by refractory oxides of metals from groups IIa, IIIa, IVa and IVb of the periodic classification of the elements, and mixtures thereof in all proportions.

Generally, aluminium oxides with general formula $Al_2O_3$, $nH_2O$ are used. Their specific surface area is in the range 10 m$^2$/g to 500 m$^2$/g. Oxides in which n is in the range 0 to 0.6 are conventionally produced by controlled dehydration of hydroxides in which $1 \leq n \leq 3$. These hydroxides are themselves prepared by precipitating aluminium salts from aqueous media using bases or acids. The precipitation and ageing conditions determine a plurality of forms of the hydroxides, the most common of which are boehinite (n=1), gibbsite and bayerite (n=3). Depending on the hydrothermal treatment conditions, these hydroxides produce a plurality of transition oxides or aluminas. Specific examples are the alpha, delta, eta, gamma, kappa, khi, rho and theta forms. These differ from each other essentially in the organisation of their crystalline structure. During heat treatment, these different forms can move between themselves in complex pathways which depend on the operating conditions of the treatment. The alpha form, which has a very low specific surface area, is stable at a higher temperature. Preferably, aluminas with a specific surface area which is in the range 20 m$^2$/g to 250 m$^2$/g, in particular gamma alumina and/or delta alumina, are used.

In order to improve the thermal stability of these oxides, various compounds can be incorporated into the porous support, either directly in the form of pigments, or in the form of oxide precursors. Rare-earths, alkaline-earth metals and silica, which are among the best stabilisers for alumina, can advantageously be incorporated into the porous support. Silica is usually used as the stabiliser, in an amount of 1% to 6% by weight with respect to the porous support.

In general, these supports as used in the present invention have advantageously been treated, as is well known in the art, with pore-forming agents such as those based on cellulose, naphthalene, natural gums or synthetic polymers, to provide the supports with the desired porosity.

In the catalyst for the first zone of the process of the invention, the content of the metal selected from the group formed by platinum and palladium is generally more than 3 g per liter of catalyst, and is preferably in the range 5 to 20 g per liter of catalyst, more particularly in the range 5 to 15 g per liter of catalyst. If the amount of precious metal is below 3 g, the catalytic activity is not sufficiently high to satisfy the demands of the combustion process. In contrast, when the amount of precious metal exceeds 20 g, any further increase in the amount of precious metal does not significantly increase the catalytic activity. Palladium is preferred. However, platinum can advantageously be used for a combustion stage which is carried out at relatively low temperatures, for example at about 500° C., or it can be combined with palladium.

The presence of iron and cerium deposited simultaneously on the refractory inorganic oxide or oxides reinforces the activity and stability of the catalyst over time. The presence of zirconium can reinforce this synergistic effect still further.

The cerium content in the catalyst for the first zone in the process of the invention is preferably in the range 0.3% to 20% by weight with respect to the support, more preferably in the range 2% to 15% by weight with respect to the porous support. If the cerium content is below 0.3%, the catalytic activity is not satisfactorily promoted. In contrast, when the cerium content exceeds 20% by weight with respect to the porous support, any further increase in the cerium content does not significantly increase the catalytic activity.

The iron content in the catalyst for the first zone in the process of the invention is preferably in the range 0.01% to 3.5% by weight with respect to the support, more particularly in the range 0.1% to 2%. If the iron content exceeds 3.5%, the iron then greatly accelerates the drop in the specific surface area of the alumina based porous support.

The zirconium content in the catalyst for the first zone of the process of the invention is generally in the range 0 to 20% by weight with respect to the porous support, preferably in the range 0.3% to 20% by weight and more particularly in the range 2% to 15% by weight with respect to the porous support. When the zirconium content reaches 20% by weight with respect to the porous support, any further increase in the zirconium content does not significantly increase the catalytic activity.

The preparation of the catalyst for the first zone, deposited on a substrate, consists of a coating step, during which the substrate is immersed in a suspension containing precursors of the catalyst components, and is then dried and calcined after evacuation of excess suspension. A second, impregnation, step deposits the active metals. In this step, the coated substrate is brought into contact with one or more solutions of the active metal precursor or precursors. After any necessary draining, the coated and impregnated substrate is dried and then heat treated.

The cerium, iron and optional zirconium are deposited on the support of the catalyst for the first zone of the process of the present invention using any technique which is known to the skilled person and can be carried out at any time during the preparation of the catalyst. These elements can be introduced in the form of solid compounds (oxides, hydroxides, carbonates, hydroxycarbonates, or insoluble salts) or soluble compounds (nitrates, sulphates, chlorides, alcoholates) into the coating suspension, and/or pre-impregnated onto one of the constituents of the coating suspension, and/or deposited on the porous support before impregnation with the noble metals, and/or co-impregnated with these metals depending on the technique used. When the cerium, iron and optional zirconium are deposited after forming the aluminas which may contain other metals, the methods used can, for example, be dry impregnation, or impregnation using excess solution, or ion exchange. With a support which has already been formed, a preferred method for introducing the noble metal is impregnation in an aqueous medium using excess solution. The impregnating solvent is eliminated after impregnation by drying and calcining in air at a temperature which is in the range 300° C. to 900° C.

In one particular implementation, the support is successively impregnated with a solution containing compounds containing cerium, iron and optionally zirconium, then with one or more solutions containing the precious metal compounds which are to be introduced.

Particular examples of compounds of cerium, iron and zirconium which can be used are cerium, iron and zirconium salts, more particularly cerous nitrate, cerous acetate, cerous chloride and ammoniacal ceric nitrate, ferric nitrate, ammoniacal iron citrate and ferric chloride, and zirconyl nitrate and zirconium tetrachloride.

The precursors of the metals from the group formed by platinum and palladium are those which are conventionally used for catalyst preparation, in particular chlorides, chlorine-containing complexes, nitrates, ammine-containing complexes or acetylacetonates. Examples are chloroplatinic acid, palladium chloride, platinum chloride tetrammine, dinitrodiamminoplatinum and palladium nitrate.

The impregnation depth can advantageously be regulated using methods which are known to the skilled person, in particular addition of a certain quantity of inorganic or organic acid to the solution of precious metals. Nitric, hydrochloric and hydrofluoric acid or acetic, citric and oxalic acids are generally used.

In the catalyst for the second zone of the process of the invention, the atomic ratio of A to the sum of B+C+Al is about 0.06 to 0.1, and $A_{1-x}B_yC_zAl_{12-y-z}O_{19-\delta}$ is a lamellar hexaaluminate in which element B and/or element C are incorporated into the structure. Further preferred features of the catalyst for the second zone of the process of the invention are that element A is lanthanum or barium, element B is manganese and element C is magnesium.

When the atomic ratio of A to the sum of B+C+Al is 1/12 for alkaline-earths and 1/1 to 1/14 for rare earths, the formulation $A_{1-x}B_yC_zAl_{12-y-z}O_{19-\delta}$ has a maximum thermal stability. However, the atomic ratio of A to the sum of B+C+Al is not limited to these ratios: preferably, it is close to these ratios and it is about 0.06 to 0.1. This preferred range of ratios confers the catalytic formulation: $A_{1-x}B_yC_zAl_{12-y-z}O_{19-\delta}$ with resistance to sintering at high temperatures. For values of the atomic ratio of A to the sum of B+C+Al greatly below 0.06, alpha alumina, commonly known as corindon, is the major form which appears during calcining. For values of the atomic ratio of A to the sum of B+C+Al which greatly exceed 0.1, new crystalline structures form depending on the nature of element A: $AO—Al_2O_3$, $A_2O_3—Al_2O_3$, etc; these do not have as high a resistance to sintering as $A_{1-x}B_yC_zAl_{12-y-z}O_{19-\delta}$ compositions in which the atomic ratio of A to the sum of B+C+Al is about 0.06 to 0.1. The oxide which constitutes the major portion of the catalyst for the second zone of the process of the present invention preferably has a lamellar hexaaluminate type crystalline structure close to (or similar to) magnetoplumbite (for example $A_{1-x}B_yC_zAl_{12-y-z}O_{19-\delta}$ where M=Ba, Ca or Sr), β-alumina or $La_2O_3/11-14-Al_2O_3$. This crystalline structure is assumed to be the source of the greater heat resistance of the catalyst for the second zone of the process of the present invention. This crystalline structure appears at temperatures below or equal to the alpha alumina transition temperature, thus avoiding the alpha transition and the resulting drop in specific surface area and reduction in catalytic activity.

Elements B and C, which are the active components of the catalyst for the second zone, are fixed or incorporated in the lamellar hexaaluminate structure described above. This incorporation or fixing is assumed to be the source of the good sintering resistance of active elements B and C and resulting high retention of catalytic activity over time. Further, the proximity of the two active elements B and C in the hexaaluminate structure have a synergistic effect on the catalytic activity. This synergistic effect may provide the catalyst for the second zone of the process of the present invention with its greater catalytic activity.

The values of y and z which represent the composition of the active elements B and C in the preferred formula for the catalyst for the second zone of the process of the present invention, $A_{1-x}B_yC_zAl_{12-y-z}O_{19-\delta}$, are preferably and respectively in the range 0.5 to 3 and in the range 0.01 to 3, and more preferably in the range 0.5 to 2 and in the range 0.01 to 2. If the values y and z are respectively less than 0.5 and 0.01, there are not enough active components in the formulation and the catalytic activity is not sufficiently high to satisfy the demands of the combustion process. In contrast, if the values y and z of the active elements are greater than 3, a majority of the catalytic components cannot be incorporated into the lamellar hexaaluminate structure and thus they cannot contribute to the catalytic activity. They form a distinct oxide phase in the catalyst formulation.

In a variation of the invention, the catalyst for the second zone can also include a platinum group metal. This platinum group metal can be deposited on the surface of the catalyst (for example by impregnation) or it can be incorporated during preparation. It may be effective to impregnate or incorporate a platinum group metal into the catalyst for the second zone to improve its activity at low temperature. Further, by incorporating the platinum group metal during preparation, the sintering resistance can be further increased. Such catalysts, impregnated with a platinum group metal or containing a platinum group metal incorporated during preparation, are also included in the scope of the present invention.

More detail will now be given of the precursors of the elements forming the composition of the catalyst for the second zone of the process of the present invention, which is resistant to high temperatures and which principally comprises a composite oxide of at least one element A, at least one element B, at least one element C and aluminium.

The precursor for the aluminium which constituted the major element of the catalyst is preferably an alumina from the group formed by transition aluminas and alumina hydrates: gamma aluminas, boehmite, gibbsite, bayerite, etc. . . . when using a traditional method which reacts powders in the solid state. When a co-precipitation method is used to produce the catalyst, a soluble aluminium compound such as aluminium nitrate, aluminium sulphate, aluminium chloride, etc. is preferably used. When the catalyst is produced by hydrolysing an organic compound, a soluble aluminium compound such as an aluminium alkoxide is preferably used.

A solid compound (oxide, hydroxide, carbonate, hydroxycarbonate or insoluble salt) or a soluble compound (nitrate, sulphate, chloride or alkoxide) can be used as the precursor for element A, depending on the technique to be used.

Barium, strontium or a rare-earth is generally used as element A, preferably lanthanum or barium.

The precursors for elements B and C, which are essentially responsible for the catalytic activity of the formulation, can be a solid compound (oxide, hydroxide, carbonate, hydroxycarbonate or insoluble salt) or a soluble compound (nitrate, sulphate, chloride or alkoxide), depending on the technique to be used. Mn, Fe and/or Co are generally used for element B of the catalyst for the second zone of the process of the present invention, preferably Mn and/or Co, more preferably Mn. Element C is preferably Mg.

Depending on the different precursors for the aluminium and elements B and C, different methods can be used to prepare the catalysts or catalyst supports: solid state reaction, complexation, alkoxide hydrolysis, co-precipitation, impregnation or a sol-gel process.

In accordance with the invention, these formulations can be in the form of monoliths, spherules, tablets, extrudates or other forms which are commonly used for catalysts and catalyst supports.

The invention also relates to the use of these catalysts deposited on various metallic or ceramic substrates. These substrates can be monoliths such as those described above.

In general, the preparation process for these catalysts includes one or more intermediate and/or final calcining steps which transform the catalyst precursors to the catalyst of the present invention.

In order to produce the catalyst for the second zone, calcining is preferably carried out at a temperature which is greater than or equal to 900° C. When calcining is carried out at a temperature below 900° C., the precursors are not transformed into the desired oxide within a reasonable, practical time period. However, with temperatures of 1500° C. or more, the specific surface area of the hexaaluminate obtained tends to reduce sharply due to accelerated crystal growth at this temperature. The calcining conditions must therefore be selected for the desired specific surface area to produce a catalyst for the second zone of the process of the present invention with a specific surface area which is compatible with a catalytic combustion process.

Different methods can be used to prepare the catalysts or catalyst supports, such as solid state reactions between powders, alkoxide hydrolysis, complexation, co-precipitation, impregnation, or a sol-gel process.

The catalyst for the second zone can be prepared from a mixture of solid pigment powders (oxides, hydroxides, carbonates, hydroxycarbonates or insoluble salts) but more preferably, it is produced by a process consisting of dissolving and mixing a soluble aluminium compound in water and/or in alcohol, a compound of an element A selected from the group formed by barium, strontium and the rare-earths which is soluble in water and/or alcohol, a compound of an element B selected from the group formed by Mn, Co and Fe which is soluble in water and/or alcohol and a compound of the element C selected from the group formed by Mg and Zn which is soluble in water and/or alcohol, such that the atomic ratio of A to the sum B+C+Al is about 0.06 to 0.1, the atomic ratio of B to the sum B+C+Al is about 0.04 to 0.2 and the atomic ratio of C to the sum B+C+Al is about 0.01 to 0.2, to produce precipitation, hydrolysis and/or thermal decomposition which results in the formation of a product in the solution, extracting the product from the solution, pre-calcining the extracted product between 200° C. and 600° C. and calcining the product at a temperature of at least 900° C. Of the methods cited above, co-precipitation and alkoxide hydrolysis are preferably used. While the following detailed explanation treats co-precipitation more specifically, alkoxide hydrolysis can also be used. Similarly, lanthanum, manganese and magnesium have been selected to illustrate the preparation process; however, other elements could also have been used.

The catalyst for the second zone is preferably prepared as follows. In a first phase, a mixture containing a water-soluble aluminium salt, a water-soluble lanthanum salt, a water-soluble manganese salt and a water-soluble magnesium salt is prepared. In a second phase, the hydroxides of the soluble salts used in the first phase are co-precipitated. Co-precipitation can be effected by adding the precipitation agent to the solution or by adding the mixture of soluble salts to the precipitating agent. Preferably, precipitation is carried out under stationary conditions, the solution containing the soluble salts and that containing the precipitating agent being added simultaneously, their flow rates being controlled by the measured pH, in an overflow reactor in which precipitation occurs. Co-precipitation is carried out in a pH range in which complete co-precipitation of all the precursor constituents of the catalyst for the second zone of the process of the present invention occurs. In the example studied, this precipitation is carried out at a pH which is in the range 7 to 12. In addition to the hydroxides of the precursors for Mn, La, Al and Mg which precipitate, undesirable compounds form which are eliminated by filtering and/or simply washing with water. The co-precipitate is then dried and pre-calcined between 200° C. and 650° C., then the product obtained is calcined at a temperature which is in the range 900° C. to 1500° C. for 5 to 30 hours to transform it into the catalyst for the second zone of the process of the present invention.

Particular examples of soluble aluminium compounds which can be used are aluminium nitrate, aluminium chloride, etc. Particular examples of soluble lanthanum compounds which can be used are lanthanum nitrate, lanthanum chloride, etc. Particular examples of soluble manganese compounds which can be used are manganese nitrate, manganese chloride, etc. Particular examples of soluble magnesium compounds which can be used are magnesium nitrate, magnesium chloride, etc. Sodium hydroxide, sodium carbonate, potassium hydroxide and ammonia can be used as precipitating agents. The precipitating agents are selected such that all of the precursors for the catalyst for the second zone of the process of the present invention are precipitated together. It may sometimes be necessary to use a mixture of co-precipitating agents: sodium hydroxide+sodium carbonate, for example, to obtain co-precipitation of all of the precursors. Thus in the case of a catalyst for the second zone of the process of the present invention containing strontium and barium, the mixture of co-precipitating agents preferably contains sodium carbonate. Separate precipitation of the different precursors is also possible, followed by mixing together the products obtained to produce the precursor for the catalyst for the second zone of the process of the present invention.

The process of the invention improves performances, particularly for the ccatalytic combustion of hydrocarbons such as methane, carbon monoxide, hydrogen or mixtures thereof.

The following examples illustrate the invention without limiting its scope.

The various precursors used were products sold by PRO-LABO®. The elementary catalyst composition was determined by X ray fluorescence (PHILIPS PW 1480®.

EXAMPLE 1

Preparation of catalysts CP1A for the first zone and CP1B for the second zone of process P1 of the present invention

EXAMPLE 1a

Preparation of catalyst CP1A for the first zone of process P1 of the invention

Iron and cerium were deposited on gamma alumina by impregnating 700 g of alumina with an aqueous solution of cerous nitrate and ferric nitrate. This solution contained the equivalent of 45 g of cerium oxide ($CeO_2$) and 15 g of iron oxide ($Fe_2O_3$).

The impregnated alumina was dried at 150° C. then calcined in air at 600° C. for 3 hours.

A coating suspension was prepared from two liters of deionised water to which the equivalent of 12 g of nitric acid, 600 g of gamma type alumina which had been impregnated with iron and cerium and 140 g of pseudo-boehmite containing 72% of dry matter had been added. This suspension was ground to produce a particle size of less than 10 microns.

In a first, coating, step, 0.84 liters of a ceramic monolith (cordierite) with 62 cells per cm² (400 cells per square inch) was immersed in the suspension, then drained before eliminating the excess suspension by blowing. The support was dried then calcined in an oven with the temperature maintained at 600° C. for two hours. These steps of immersion, blowing and calcining were carried out a second time to deposit the equivalent of 200 g of porous support per litre of catalyst (substrate).

In a second, impregnation, step, the coated monolith was immersed in a solution of palladium nitrate so that the quantity of palladium fixed after drying and calcining at 500° C. for two hours was 5% by weight of palladium with respect to the porous support or, expressed with respect to the catalyst: 10 g of palladium per litre of catalyst.

This catalyst for the first zone contained 4.13% of cerium, 1.31% of iron and 5% of palladium, by weight with respect to the porous support.

EXAMPLE Ib

Preparation of catalyst CP1B for the second zone of process P1 of the invention

Aluminium nitrate $Al(NO_3)_3$, $9H_2O$, barium acetate $Ba(O_2C_2H_5)_2$, manganese nitrate $Mn(NO_3)_2$, $4H_2O$ and magnesium nitrate $Mg(NO_3)_2$, $6H_2O$ were placed in deionised water and the crystals were allowed to dissolve completely. Stirring was continued for 1 hour to homogenise the mixture. Co-precipitation with ammonium carbonate was carried out to obtain an overall pH of 9 at a constant temperature of between 20° C. and 100° C. The precipitate obtained was filtered and washed with distilled water to eliminate the excess ammonium carbonate and the ammonium nitrate resulting from precipitation. The filter cake was oven dried for 12 hours at 120° C., then calcined in air in an alumina crucible at 600° C. for four hours then at 1200° C. in air for sixteen hours.

A catalyst CP1B was obtained which had the composition $BaMnMgAl_{10}O_{19-\delta}$. The BET surface area of catalyst CP1B was of the order of 15 m²/g.

A coating composition was prepared from two liters of deionised water with powdered catalyst CP1B added. This suspension was ground to produce a particle size of below 10 microns.

0.84 liters of a ceramic monolith (cordierite) with 62 cells per cm² was immersed in the suspension, then drained before eliminating the excess suspension by blowing. The support was dried then calcined in an oven with the temperature maintained at 600° C. for two hours. These steps of immersion, blowing and calcining were carried out a second time to deposit the equivalent of 120 g of catalyst CP1B per liter of substrate.

EXAMPLE 2

Preparation of catalysts CP2A for the first zone and CP2B for the second zone for process P2 of the present invention Cerium, zirconium and iron were deposited on gamma alumina by impregnating 700 g of alumina with an aqueous solution of cerous nitrate, zirconyl nitrate and ferric nitrate. This solution contained the equivalent of 51.5 g of cerium oxide ($CeO_2$), 43 g of zirconium oxide ($ZrO_2$) and 6.5 g of iron oxide $Fe_2O_3$).

A coating suspension was prepared from two liters of deionised water to which the equivalent of 12 g of nitric acid, 600 g of gamma type alumina which had been impregnated with cerium, zirconium and iron and 140 g of pseudo-boehmite containing 72% of dry matter had been added. This suspension was ground to produce a particle size of less than 10 microns.

In a first, coating, step, 0.84 liters of a ceramic monolith of cordierite with 62 cells per cm² (400 cells per square inch) was immersed in the suspension, then drained before eliminating the excess suspension by blowing. The support was dried then calcined in an oven with the temperature maintained at 600° C. for two hours. These steps of immersion, blowing and calcining were carried out a second time or a third time to deposit the equivalent of 200 g of porous support per liter of catalyst (substrate).

In a second, impregnation, step, the coated monolith was immersed in a solution of palladium nitrate so that the quantity of palladium fixed after drying and calcining at 500° C. for two hours was 3% by weight of palladium with respect to the porous support, or, expressed with respect to the catalyst: 10 g of palladium per liter of catalyst.

This catalyst CP2A contained 6% of cerium, 4.55% of zirconium, 0.5% of iron and 5% of palladium, by weight with respect to the porous support.

Catalyst CP2B was identical to catalyst CP1B.

EXAMPLE 3 (comparative)

Preparation of catalysts CP3A for the first zone and CP3B for the second zone for process P3

In order to show the importance of a formulation containing both iron, cerium and a palladium-based active phase, a coating suspension was prepared from two liters of deionised water to which the equivalent of 12 g of nitric acid, 600 g of gamma type alumina containing neither iron nor cerium and 140 g of pseudo-boehmite containing 72% of dry matter had been added. This suspension was ground to produce a particle size of less than 10 microns.

0.84 liters of a ceramic monolith of cordierite with 62 cells per cm$^2$ (400 cells per square inch) was coated with this alumina suspension using the procedure of Example 1, to deposit 200 g of alumina per litre of catalyst (substrate).

The monolith was impregnated with a solution of palladium to deposit 5% by weight of palladium with respect to the coated porous support or, expressed with respect to the catalyst: 10 g of palladium per liter of catalyst.

Catalyst CP3B was identical to catalyst CP1B.

EXAMPLE 4 (comparative)

Preparation of catalysts CP4A for the first zone and CP4B for the second zone for comparative process P4

Catalyst CP4A was identical to catalyst CP1A.

In order to show the necessity of producing a lamellar hexaaluminate type structure where the magnesium and manganese are incorporated in the structure, a catalyst was prepared which was representative of the perovskite family.

Catalyst CP4B was prepared using the method described in Example 1 of European patent application EP-A-0 089 199 from a mixture of lanthanum and manganese oxides. The composition of catalyst CP4B obtained was $LaMnO_3$.

EXAMPLE 5 (comparative)

Preparation of catalysts CPSA for the first zone and CP5B for the second zone for comparative process P5

Catalyst CP5A was identical to catalyst CP3A. Catalyst CP5B was identical to catalyst CP4B.

EXAMPLE 6

Comparison of catalytic combustion processes

The process performances were compared for the combustion of methane, the principal constituent of natural gas.

Cylinders which were 1.5 cm in diameter and 5 cm long in the longitudinal direction of the channels were cut from the prepared catalysts (references CP1A to CP5A and (CP1B to CP5B).

Tests were carried out in a laboratory reactor comprising a tube into which the catalyst was introduced. The tube was placed in the centre of a cylindrical furnace which could be heated to a temperature of 1500° C. An air/methane mixture containing 3.5% by volume of methane was prepared using mass flow regulators and sent to the reactor inlet. The hourly gas flow rate was 50000 times greater than the volume of the substrate (HSV=50000 h$^{-1}$). The methane concentration at the reactor inlet and outlet was determined using a flame ionisation detector (JUM ENGINEERING analyser model FID 3-300). The methane conversion was the percentage difference between the methane concentration at the inlet and outlet and the inlet concentration.

After raising the temperature of the reaction mixture at 5° C./min from 250° C. to 530° C., the inlet temperature of the reaction mixture was fixed at this temperature. The methane conversion was determined after 100 hours of operating at steady state. This period allowed the formulations to be distinguished as a function of their ability to stabilise methane combustion.

Table 1 shows the elemental compositions of the catalysts of the first and zones and the conversions obtained after 100 hours of operation at steady state.

TABLE 1

Composition of catalysts for first and second zones of processes P1 to P6 and conversions obtained after 100 hours of operation at steady state.

| Example no | Process ref | First zone catalyst | | | | Second zone catalyst Composition | % conversion after 100 hours of operation |
|---|---|---|---|---|---|---|---|
| | | Ce content | Fe content | Zr content | Pd content | | |
| 1 invention | P1 | 4.13 | 1.31 | 0 | 5 | $BaMnMgAl_{10}O_{19-\delta}$ | >95 |
| 2 invention | P2 | 6 | 0.5 | 4.55 | 5 | $BaMnMgAl_{10}O_{19-\delta}$ | >95 |
| 3 comparative | P3 | 0 | 0 | 0 | 5 | $BaMnMgAl_{10}O_{19-\delta}$ | 45 |
| 4 comparative | P4 | 4.13 | 1.31 | 0 | 5 | $LaMnO_3$ | 85 |
| 5 comparative | P5 | 0 | 0 | 0 | 5 | $LaMnO_3$ | 45 |

Table 1 shows that it is particularly advantageous, in a process for the multi-stage catalytic combustion of natural gas, to combine a first catalytic zone comprising catalysts containing cerium, iron and optionally zirconium, and palladium, and in a second catalytic zone a formulation having increased hydrothermal resistance: $BaMnMgAl_{10}O_{19-\delta}$.

We claim:

1. A process for the catalytic combustion of at least one fuel comprising conducting the combustion in plurality of successive catalytic zones, said process being characterized in that at least one of the first catalytic zones includes a catalyst comprising a monolithic substrate, a porous refractory inorganic oxide support and an active phase comprising (I) cerium, iron and optionally zirconium, and (II) at least one metal selected from the group consisting of palladium and platinum; and in that at least one of the subsequent catalytic zones includes an active phase comprising an oxide of:

at least one element A selected from the group consisting of barium, strontium and rare-earth elements;

at least one element B selected from the group consisting of manganese, cobalt and iron;

at least one element C selected from the group consisting of magnesium and zinc; and aluminium.

2. A process according to claim 1, comprising two catalytic zones.

3. A process according to claim 1, characterized in that in the catalyst for the first zone, the amount of porous support is in the range 100 to 400 g per litre of catalyst, the cerium content is in the range 0.3% to 20% by weight with respect to the porous support; the iron content is in the range 0.01% to 3.5% by weight with respect to the porous support; the zirconium content is in the range 0 to 20% by weight with respect to the porous support; and the palladium and/or platinum content is more than 3 g per litre of catalyst.

4. A process according to claim 3, characterized in that in the catalyst for the subsequent zone, said oxide has the formula $A_{1-x}B_yC_zAl_{12-y-z}O_{19-\delta}$, where A is at least one element with valency X selected from the group consisting of barium, strontium and rare-earths; B is at least one element with valency Y selected from the group consisting of Mg and Zn; x is 0 to 0.25, y is 0.5 to 3; and z is 0.01 to 3; the sum y+z having a maximum value of 4, and $\delta$ having a value equal to $1-\frac{1}{2}\{(1-x)X+yY-3y-z\}$.

5. A process according to claim 1, characterized in that in the catalyst for the first zone, the amount of porous support is in the range 200 to 350 g per litre of catalyst, the cerium content is in the range 2% to 15% by weight with respect to the porous support; the iron content is in the range 0.1% to 2% by weight with respect to the porous support; the zirconium content is in the range 2% to 15% by weight with respect to the porous support; and the palladium and/or platinum content is in the range 5 to 20 g per litre of catalyst.

6. A process according to claim 5, characterized in that in the catalyst for the subsequent zone, said oxide has the formula $A_{1-x}B_yC_zAl_{12-y-z}O_{19-\delta}$, where A is at least one element with valency X selected from the group consisting of barium, strontium and rare-earths; B is at least one element with valency Y selected from the group consisting of Mn, Co and Fe; C is at least one element selected from the group consisting of Mg and Zn; x is 0 to 0.25, y is 0.5 to 3; and z is 0.01 to 3; the sum y+z having a maximum value of 4, and $\delta$ having a value equal to $1-\frac{1}{2}\{(1-x)X+yY-3y-z\}$.

7. A process according to claim 5, characterized in that in the catalyst for the subsequent zone, element A is lanthanum or barium, element B is manganese and element C is magnesium.

8. A process according to claim 1, characterized in that, in the catalyst for the first zone, the in lieu of porous support based on a refractory inorganic oxide is selected from the group consisting of alpha alumina, delta alumina, eta alumina, gamma alumina, kappa alumina, khi alumina, rho alumina, theta alumina, silica, silica-aluminas, titanium oxide, zirconia and mixtures thereof.

9. A process according to claim 8, characterized in that in the catalyst for the first zone, said porous refractory inorganic oxide support has a specific surface area which is in the range 20 m$^2$/g to 250 m$^2$/g.

10. A process according to claim 1, characterized in that in the catalyst for the first zone, said support has been thermally stabilised by introducing at least one compound selected from the group consisting of the oxides of trivalent rare-earths, the oxides of alkaline-earth metals, and silica.

11. A process according to claim 10, characterized in that in the catalyst for the first zone, said support has been thermally stabilised with silica in an amount of 1% to 6% by weight with respect to said porous support.

12. A process according to claim 1, characterized in that in the catalyst for the first zone, said substrate is metallic or ceramic.

13. A process according to claim 1, characterized in that in the catalyst for the second zone, said oxide has the formula $A_{1-x}B_yC_zAl_{12-y-z}O_{19-\delta}$ where A is at least one element with valency X selected from the group consisting of barium, strontium and rare-earths, B is at least one element with valency Y selected from the group consisting of Mn, Co and Fe; C is at least one element selected from the group consisting of Mg and Zn; x is 0 to 0.25, y is 0.5 to 3; and z is 0.01 to 3; the sum y+z having a maximum value of 4, and $\delta$ having a value equal to $1-\frac{1}{2}\{(1-x) X+yY-3y-z\}$.

14. A process according to claim 13, characterized in that in said oxide, the atomic ratio of A to the sum B+C+Al is about 0.06 to 0.1.

15. A process according to claim 13, characterized in that in said oxide, the values of y and z are respectively in the range 0.5 to 2 and 0.01 to 2.

16. A process according to claim 1, characterized in that in the catalyst for the subsequent zone, element A is lanthanum or barium, element B is manganese and element C is magnesium.

17. A process according to claim 1, characterized in that in the catalyst for the subsequent zone, said oxide is a lamellar hexaaluminate in which element B and/or element C are incorporated in the crystalline structure.

18. A process according to claim 1, characterized in that in the catalyst for the subsequent zone, said oxide is supported on a metallic or ceramic substrate.

19. A process according to claim 18, in which the substrate is a material with a monolithic form and a cellular structure.

20. A process according to claim 1, characterized in that in the catalyst for the subsequent zone, said oxide contains a platinum group metal deposited on its surface or incorporated during preparation.

* * * * *